United States Patent [19]

Kurosawa

[11] Patent Number: 4,555,752

[45] Date of Patent: Nov. 26, 1985

[54] AC POWER CONVERTER WITH COMMUTATION CIRCUIT FOR REDUCING REACTIVE POWER

[75] Inventor: Ryoichi Kurosawa, Tokyo, Japan

[73] Assignee: Kabushiki Kaisha Toshiba, Kawasaki, Japan

[21] Appl. No.: 613,730

[22] Filed: May 24, 1984

[30] Foreign Application Priority Data

May 31, 1983 [JP] Japan .................................. 58-96129

[51] Int. Cl.[4] .......................................... H02M 7/757
[52] U.S. Cl. ..................................... 363/68; 363/129; 323/207
[58] Field of Search .................. 323/207, 210; 363/68, 363/128, 129

[56] References Cited

U.S. PATENT DOCUMENTS 4,181,932  1/1980  Fujiwara .............................. 363/68

FOREIGN PATENT DOCUMENTS 52-3447     1/1977  Japan .
54-113847   9/1979  Japan .
55-109172   8/1980  Japan ..................................... 363/68
54115688    4/1981  Japan ..................................... 363/68
56-158735   7/1981  Japan ..................................... 363/68

Primary Examiner—William H. Beha, Jr.
Assistant Examiner—Jeffrey Sterrett
Attorney, Agent, or Firm—Oblon, Fisher, Spivak, McClelland & Maier

[57] ABSTRACT

A power converter utilizes first and second thyristor bridges energized by two AC power sources which are insulated from each other. The power converter includes first and second auxiliary thyristor circuits each containing plural thyristors, and a commutation circuit. The cathode of each thyristor of first auxiliary thyristor circuit is connected to one of the AC power sources, and the anode of respective thyristors are connected each other at a common node. The anode of each thyristor of second auxiliary thyristor circuit is connected to the other of the AC power sources, and the cathode of respective thyristors are connected each other at another common node. The commutation circuit is connected between the common nodes of the first and second auxiliary thyristor circuits.

20 Claims, 15 Drawing Figures

AC POWER CONVERTER WITH COMMUTATION CIRCUIT FOR REDUCING REACTIVE POWER

BACKGROUND OF THE INVENTION

The present invention relates to a power converter for converting AC power to DC power or converting the frequency of AC power to a different frequency and, more particularly, relates to a power converter having a function of reducing the reactive power of an AC power supply.

FIG. 1 shows a circuit configuration of a power converter which involves a problem to be solved by the present invention. An AC power supply 1 is connected to the primary of each of first and second power transformers 2 and 3. Transformers 2 and 3 are isolated from each other and constitute two separate power sources. The secondary of transformer 2 is connected to a first thyristor bridge 4 being formed of GTO (gate turn-off) or self-extinction type thyristors. The secondary of transformer 3 is connected to a second thyristor bridge 5 being formed of general thyristors. Reference numeral 6 denotes a filtering power reactor, 7 denotes a load, and 8 denotes a surge absorbing circuit consisting of resistors and capacitors. In this circuit configuration, the triggering for first thyristor bridge 4 is controlled in a phase-advanced mode, while the triggering for second thyristor bridge 5 is controlled in a phase-delayed mode. Then, phase-advanced reactive power and phase-delayed reactive power generated by the respective thyristor bridges are cancelled, so that the reactive power of AC power supply 1 is reduced. Thus, the power converter of FIG. 1 can operate with a unity power factor for the fundamental wave.

In the configuration of FIG. 1, when the thyristor bridge is controlled in a general phase-delayed mode, a commutation is performed, without requiring a self-extinction function by the thyristors, by simply triggering the thyristor to be supplied with a current of the next triggering sequence. In this case, a current flow is shifted or commutated from the thyristor in a current feeding state to the thyristor to be triggered next, and the current feeding phase of the power supply is changed. Such a commutation is called a natural commutation. According to a natural commutation, a current is sequentially switched in accordance with the difference in the phase voltages of power sources 2 and 3, and substantially no surge voltage is generated.

In contrast to the above, when the thyristor bridge is controlled in a phase-advanced mode, phase-advance/phase-delay relations of the phase voltages from power sources 2 and 3 are reversed. In this case, mere triggering for thyristors to be triggered next does not ensure a complete commutation. Thus, thyristors in a current feeding state must be positively turned off by a suitable means. In a GTO thyristor, this turning off operation is performed within a quite short period, so that the current flowing through the transformers is instantaneously cut off. From this, a surge voltage, caused by electromagnetic energy stored in the leakage inductance of transformers and other inductances of associated wirings, is generated. Surge absorbing circuit 8 is provided for suppressing such a surge voltage. Most of the electromagnetic energy is consumed as power loss in surge absorbing circuit 8. Although it depends on the value of the leakage inductance of transformers, this power loss amounts to several % to ten % of the handling power, and the power conversion efficiency is correspondingly degraded. This is the problem of the configuration of FIG. 1.

FIG. 2 shows a circuit configuration of another power converter whose power conversion efficiency is improved, but it still involves a problem to be solved. The circuit configuration of FIG. 2 is substantially identical to that disclosed in FIG. 4 of Japanese Patent Publication No. 51-22606. The surge absorbing circuit of FIG. 2 is formed of a rectifier 9, capacitor 10, filtering reactor 11, thyristor bridge 12, and transformer 13. A surge voltage generated is rectified by rectifier 9 and the rectified voltage is temporarily stored in capacitor 10. The energy stored in capacitor 10 is regenerated to power supply 1 via filtering reactor 11, thyristor bridge 12 and transformer 13 according to the inverting operation of thyristor bridge 12. In this circuit, although the power conversion efficiency is improved, a bulky device for surge absorption is required. The power converter thus becomes large in size and high in manufacturing cost. This is the problem of the configuration of FIG. 2.

SUMMARY OF THE INVENTION

It is accordingly the object of the present invention to provide a power converter which can reduce the reactive power of a power supply, avoid the generation of a surge voltage, improve the power conversion efficiency, and allow a simple circuit configuration.

To achieve the above object, the power converter of the present invention utilizes first and second thyristor bridges energized by two AC power sources which are isolated from each other. The power converter is provided with a commutation circuit and first and second auxiliary thyristor circuits. Each of these auxiliary thyristor circuits includes plural thyristors. One terminal (e.g., cathode) of each thyristor of the first auxiliary thyristor circuit is connected to one of the AC power sources, and the other terminals (e.g., anode) of respective thyristors are connected to each other at a common node. One terminal (e.g., anode) for each thyristor of the second auxiliary thyristor circuit is connected to the other of the AC power sources, and the other terminals (e.g., cathode) of respective thyristors are connected to each other at another common node. The commutation circuit is connected between the common nodes of the first and second auxiliary thyristor circuits.

BRIEF DESCRIPTION OF THE DRAWINGS

FIGS. 5 to 7 illustrate the current path for explaining the commutation operation of the configuration of FIG. 3, wherein FIG. 5 illustrates the current flow around time t1 in FIG. 4, FIG. 6 shows the current path after inversion of the voltage polarity of capacitor C, and FIG. 7 shows the current path around time t2 in FIG. 4;

DETAILED DESCRIPTION OF THE PREFERRED EMBODIMENTS

Figure 1:
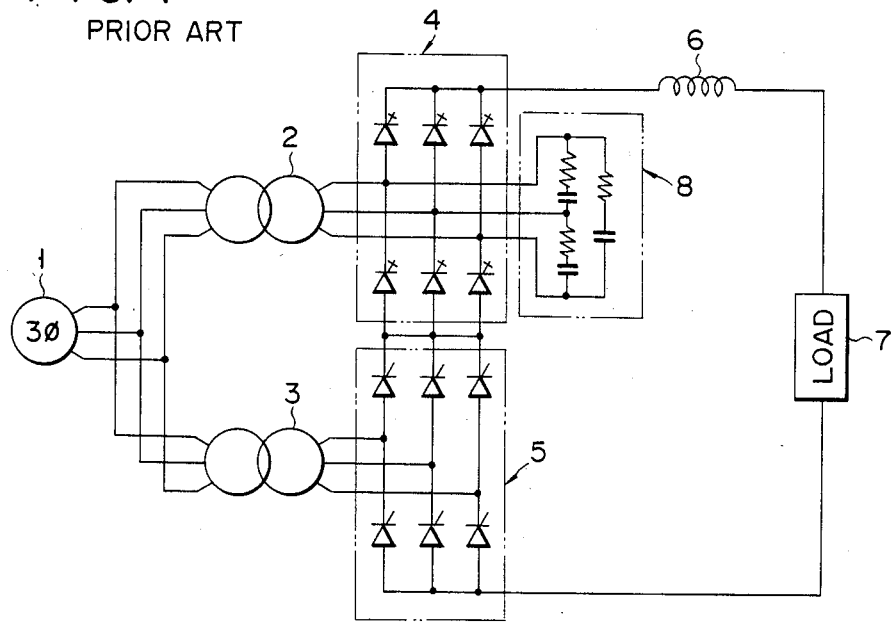
FIG. 1 shows a circuit configuration of a power converter which involves a problem to be solved by the present invention.
Figure 2:
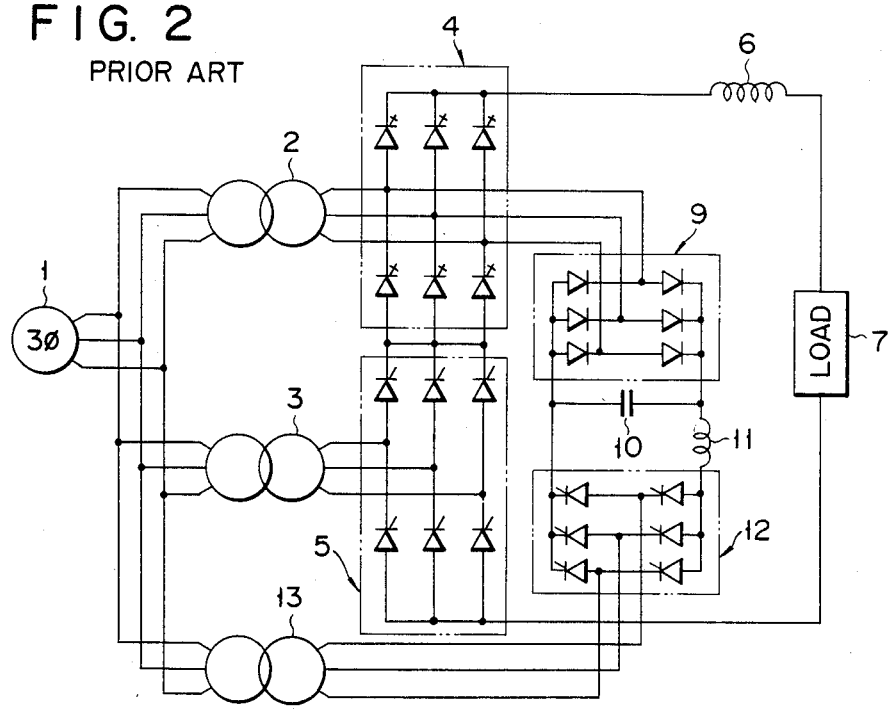
FIG. 2 shows a circuit configuration of another power converter whose power conversion efficiency is improved, but it still involves a problem to be solved.
Figure 3:
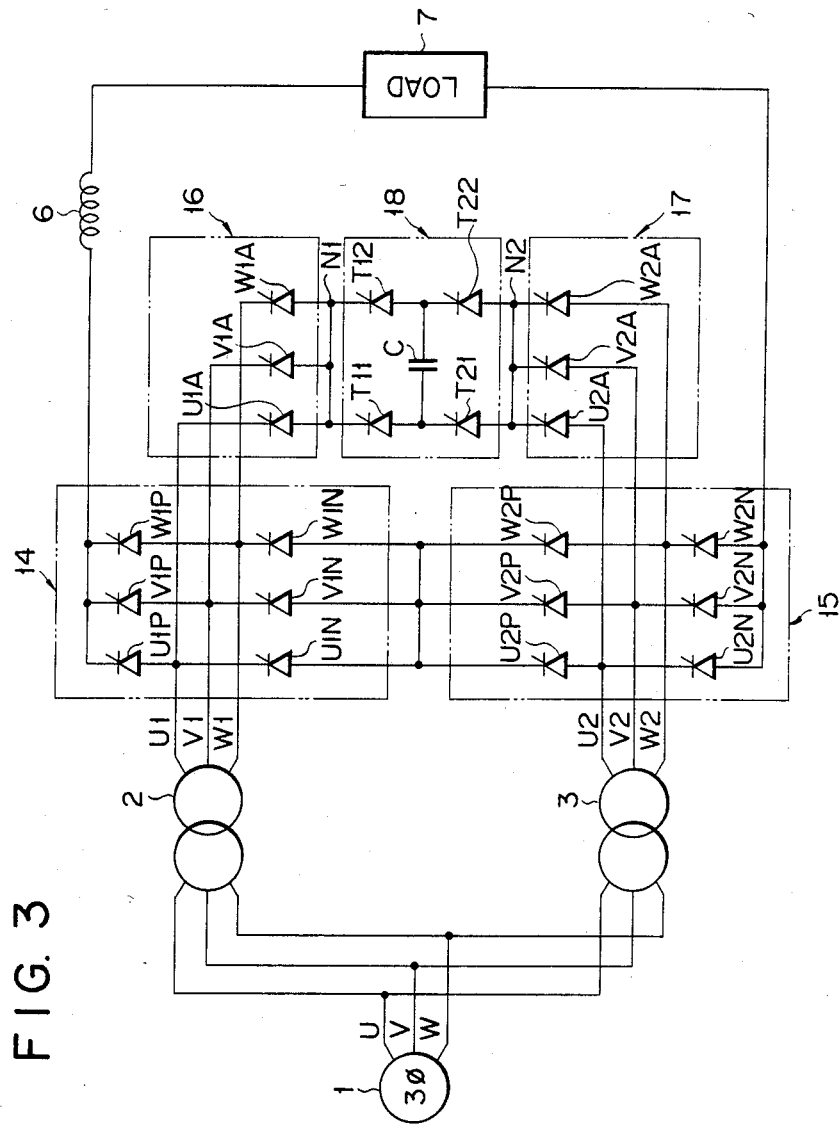
FIG. 3 shows a circuit configuration of a first embodiment of the present invention, which is applied to a three-phase AC power supply.

The present invention will now be described with reference to the accompanying drawings. FIG. 3 shows a circuit configuration of a first embodiment of the present invention. AC power supply 1, first transformer 2, second transformer 3, filtering reactor 6 and load 7 may be the same as those shown in FIG. 1 or 2. A first thyristor bridge 14 is energized by the secondary output voltages U1, V1 and W1 from first transformer 2. Thyristor bridge 14 is formed of general (conventional) thyristors U1P, V1P, W1P, U1N, V1N and W1N. A second thyristor bridge 15 is energized by the secondary output voltages U2, V2 and W2 from second transformer 3. Thyristor bridge 15 is formed of general thyristors U2P, V2P, W2P, U2N, V2N and W2N.

A first auxiliary thyristor circuit 16 is formed of general thyristors U1A, V1A and W1A. The cathodes of thyristors U1A, V1A and W1A respectively receives the secondary output voltages U1, V1 and W1 from first transformer 2. The anode of each of thyristors U1A, V1A and W1A is connected to a common node N1. A second auxiliary thyristor circuit 17 is formed of general thyristors U2A, V2A and W2A. The anodes of thyristors U2A, V2A and W2A respectively receives the secondary output voltages U2, V2 and W2 from second transformer 3. The cathode of each of thyristors U2A, V2A and W2A is connected to a common node N2. A commutation circuit 18 is inserted between the common nodes N1 and N2. Commutation circuit 18 is formed of a capacitor C and a thyristor bridge of general thyristors T11, T12, T21 and T22. One end of capacitor C is connected to the junction between the anode of thyristor T11 and the cathode of thyristor T21. The other end of capacitor C is connected to the junction between the anode of thyristor T12 and the cathode of thyristor T22. The cathode of each of thyristors T11 and T12 is connected to common node N1. The anode of each of thyristors T21 and T22 is connected to common node N2.

Figure 4:
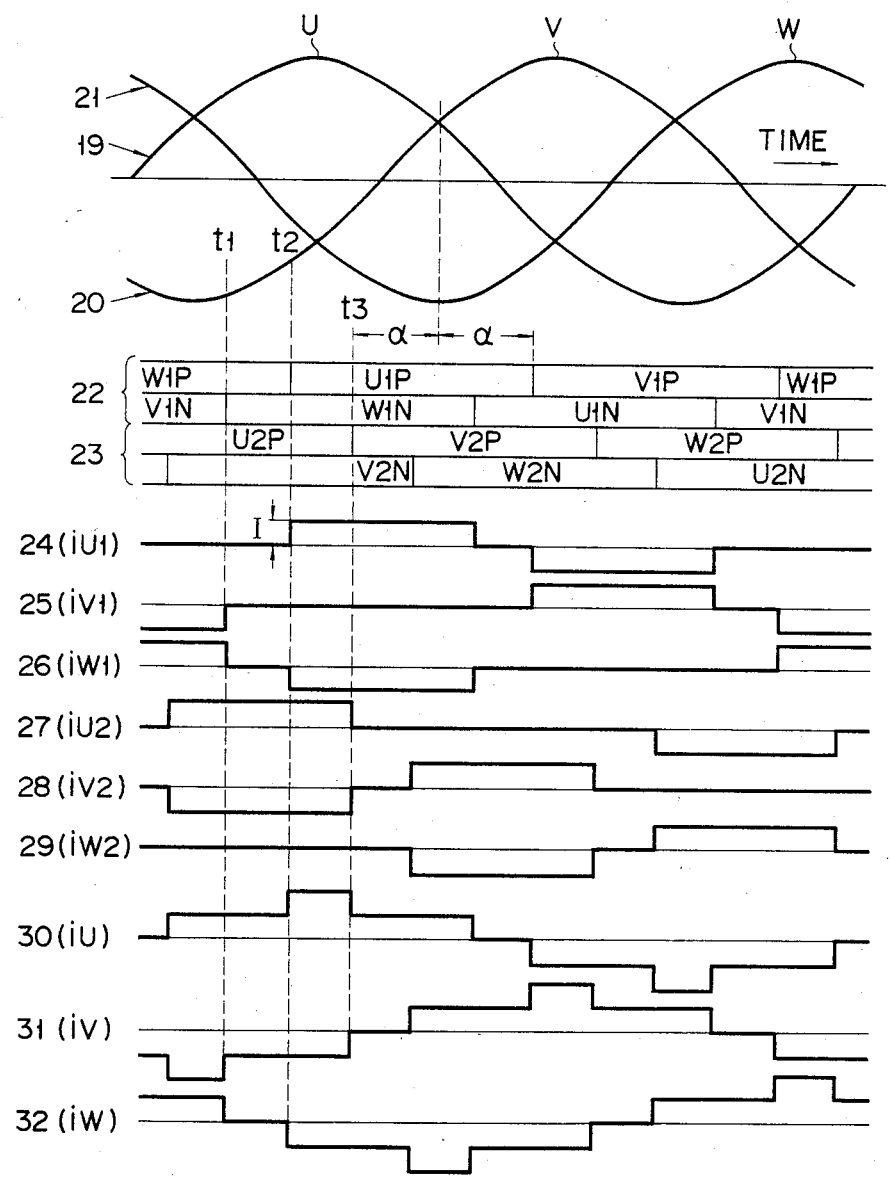
FIG. 4 is a timing chart explaining the basic operation for reducing reactive power according to the configuration of FIG. 3.

The power converter of FIG. 3 will operate as follows. FIG. 4 is a timing chart explaining the basic operation for reducing reactive power. In FIG. 4, details of the waveform during commutation are omitted. (Details thereof will be described later with reference to FIG. 13.) For the sake of simplicity, each turns ratio between the primary and secondary windings of transformers 2 and 3 is assumed to be 1:1. Then, voltage waveforms of the U phase (U1, U2) of AC power supply 1, first transformer 2 and second transformer 3 may be represented by a waveform 19 as shown in FIG. 4. Similarly, voltage waveforms of other phases V (V1, V2) and W (W1, W2) may be represented by waveforms 20 and 21, respectively. Numeral 22 indicates the conduction state of first thyristor bridge 14, and numeral 23 indicates the conduction state of second thyristor bridge 15. Symbols W1P, V1N, U2P, etc., indicate the conduction periods of corresponding thyristors in FIG. 3.

Positive side thyristors U1P, V1P and W1P of first thyristor bridge 14 are controlled with a control angle α in a phase-delayed mode. Negative side thyristors U1N, V1N and W1N of first thyristor bridge 14 are controlled with a control angle −α in a phase-advanced mode. Positive side thyristors U2P, V2P and W2P of second thyristor bridge 15 are controlled with control angle −α in a phase-advanced mode. Negative side thyristors U2N, V2N and W2N of second thyristor bridge 15 are controlled with control angle α in a phase-delayed mode. The conduction states 22 and 23 in FIG. 4 are illustrated for the control angle of α. In FIG. 3, it is assumed that the inductance of filtering reactor 6 is sufficiently large so that a constant load current I flows. Numerals 24, 25 and 26 in FIG. 4 illustrate current waveforms (iU1, iV1, iW1) of respective phases (U1, V1, W1) of the output from first transformer 2. Numerals 27, 28 and 29 illustrate current waveforms (iU2, iV2, iW2) of respective phases (U2, V2, W2) of the output from second transformer 3. Numerals 30, 31 and 32 illustrate current waveforms (iU, iV, iW) of respective phases (U, V, W) of AC power supply 1.

As may be seen from current waveforms 30, 31 and 32 in view of voltage waveforms 19, 20 and 21, when each thyristor bridge is controlled with given positive and negative control angles (+−α), the phase difference between the voltage (U, V, W) and the current (iU, iV, iW) of the fundamental wave is quite small and the power factor of fundamental wave becomes close to "1", so that the reactive power is prominently reduced.

The commutation operation of FIG. 3 configuration will be as follows. A commutation from thyristor V1N to thyristor W1N of first thyristor bridge 14, which is controlled in a phase-advanced mode at time t1 in FIG. 4, will first be described.

Figure 5:
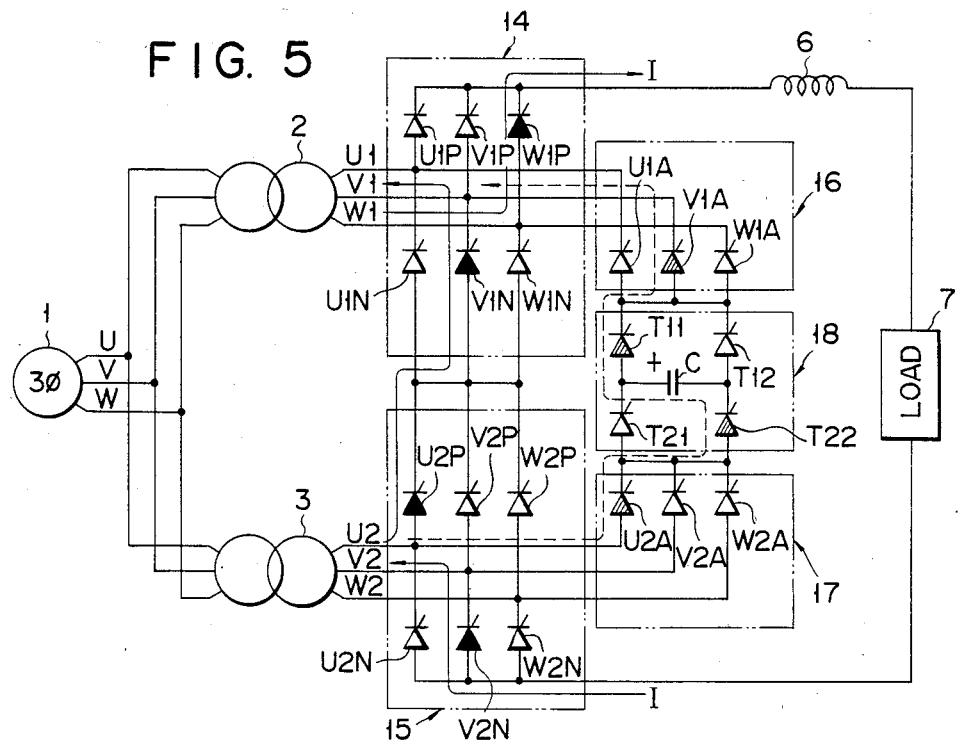

FIG. 5 illustrates the current flow in the configuration of FIG. 3 around time t1 in FIG. 4. Just before time t1, a first current path is formed through blacked-out thyristors V2N, U2P, V1N and W1P. This first current path is indicated by the solid line. Capacitor C of commutation circuit 18 has been charged with the illustrated polarity. At time t1, thyristors T11 and T22 in commutation circuit 18 and auxiliary thyristors V1A and U2A are turned on. Then, a second current path including hatched thyristors U2A and T22, capacitor C and hatched thyristors T11 and V1A is established. This second current path is indicated by the broken line and is parallel to the first current path of thyristors U2P and V1N. The second current path is associated with a voltage being higher by the voltage stored in capacitor C than a voltage of the first current path. Due to this higher voltage, the current flow is instantaneously switched from the first current path (solid line) to the second current path (broken line). Then, the voltage of capacitor C is applied as a reverse bias voltage to thyristors U2P and V1N so that these thyristors are rendered nonconductive. Following this, capacitor C is discharged by load current I and the polarity of capacitor C is inverted. In the above operation, although the current path is switched, the amount of the current flowing through transformers 2 and 3 does not change. Therefore, no surge voltage is generated.

Figure 6:
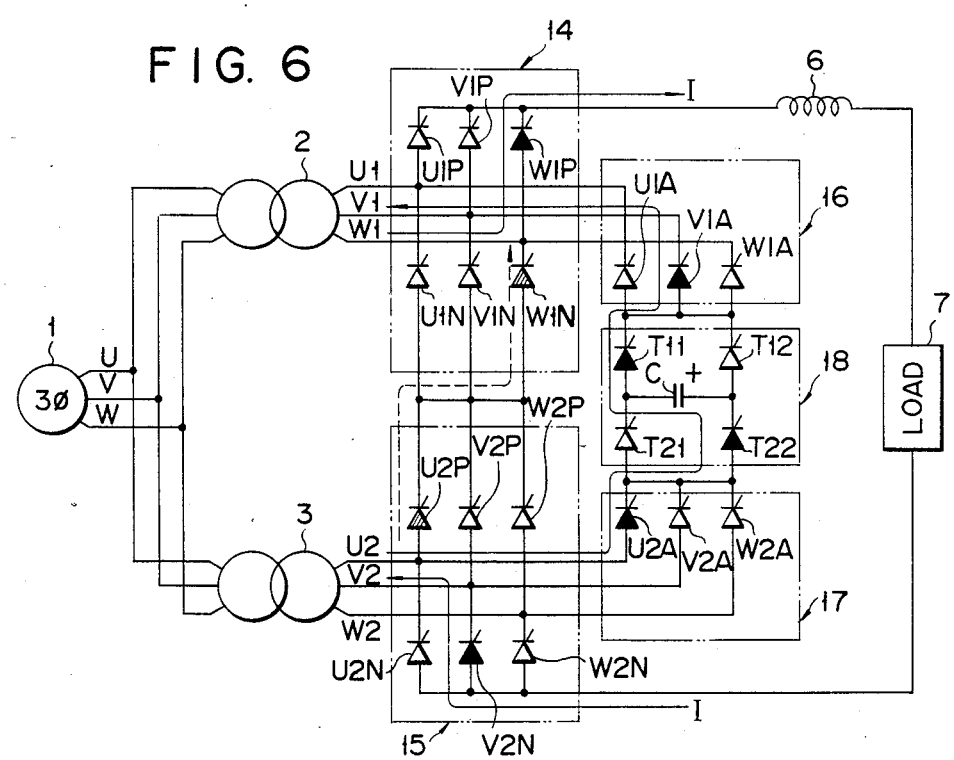

FIG. 6 shows the current path after inversion of the voltage polarity of capacitor C. When thyristors U2P and W1N are triggered, a current path indicated by the broken line and including thyristors U2P and W1N is established. Then, the voltage of capacitor C is applied between the V1 phase and the W1 phase of outputs from first transformer 2, so that the voltage potential of W1 phase increases toward the positive side. The voltage differences between V and W phases of AC power supply 1 and the voltage of capacitor C are applied to the leakage inductance of first transformer 2. The current indicated by the solid line and flowing through auxiliary transistors U2A and V1A is reduced at a rate which is determined by the above voltage differences, voltage of capacitor C and leakage inductance. At the same time, the current indicated by the broken line and flowing through thyristors U2P and W1N increases. When the current flowing through the thyristor bridges 14 and 15 becomes equal to the load current I, the current flowing through the auxiliary thyristors 16 and 17 becomes zero. Then, the operational sequence for switching at time t1 from thyristor V1N to thyristor W1N is completed.

Figure 7:
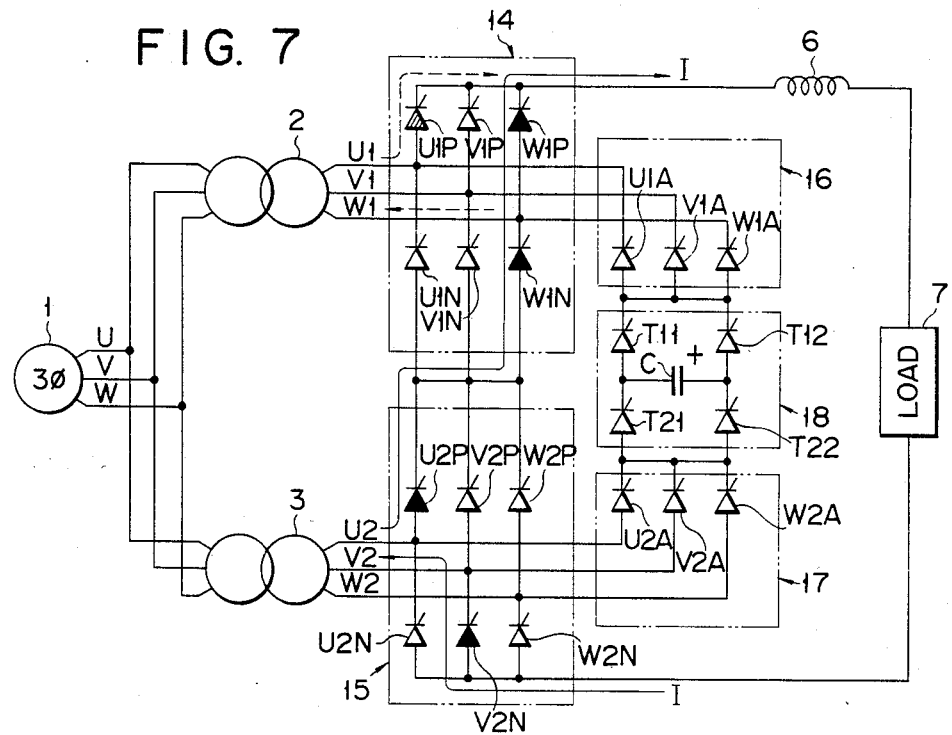

Subsequently, at time t2 in FIG. 4, a commutation from thyristor W1P to thyristor U1P is performed. FIG. 7 shows the current path around time t2. Just before time t2 and after the commutation from thyristor V1N to thyristor W1N is completed as described above, as current path indicated by the solid line and including thyristors V2N, U2P, W1N and W1P is established. The subsequent commutation from thyristor W1P to thyristor U1P is performed in a general phase-delayed mode. A current path indicated by the broken line is then established at time t2, by merely triggering the thyristor U1P. The above commutation is performed in accordance with a current change rate which is determined by the voltage difference between the W and V phases of AC power supply 1 and by the leakage inductance of first transformer 2. When the commutation is completed, the current flowing through thyristor W1P becomes zero, and the current path is established to allow the load current to flow through thyristor U1P.

At time t3 in FIG. 4, second thyristor bridge 15 is controlled in a phase-advanced mode and a commutation from thyristor U2P to thyristor V2P in second thyristor bridge 15 is carried out. Then, auxiliary thyristors W1A and U2A and thyristors T12 and T21 of commutation circuit 18 are turned on. As in the case of commutation at time t1 in a phase-advanced mode, a current path is shifted by means of the voltage of capacitor C to another current path including the auxiliary thyristors. The polarity of voltage of capacitor C is then inverted. When thyristors V2P and W1N are turned on under this voltage polarity inversion, the current path is shifted to the thyristor bridge side by the inverted voltage of capacitor C, thereby completing the commutation.

A commutation for thyristors which are controlled in a phase-delayed mode may be similarly performed by sequentially supplying triggering pulses to thyristors to be turned on. A commutation for thyristors which are controlled in a phase-advanced mode may be performed in the following manner. Two auxiliary thyristors 16, 17 and two thyristors of commutation circuit 18 are turned on in accordance with the charged voltage polarity of capacitor C. Then, the current path is temporarily shifted to the side of the auxiliary thyristors. After the inversion of the voltage polarity of capacitor C is completed, triggering pulses are supplied to two thyristors, which are to be turned on next, of thyristor bridges 14 and 15.

As may be understood from the above description, a commutation for thyristors controlled in a phase-advanced mode is performed at a moderate current change rate as in the case of a commutation for thyristors controlled in a phase-delayed mode. Accordingly, a voltage in excess of the charged voltage of capacitor C is never applied to the power supply. Further, capacitor C is repeatedly charged/discharged at each commutation for thyristors in a phase-advanced mode. For this reason, capacitor C may only be charged initially, and the circuit of FIG. 3 does not require any resistors as used in surge absorbing circuit 8 of FIG. 1. Therefore, the power converter of FIG. 3 can minimize power loss. Further, as illustrated by the solid line in FIG. 7, a current path excluding one (2) of power transformers is formed within a certain control phase angle. This reduces the power loss of the transformer.

Figure 8:
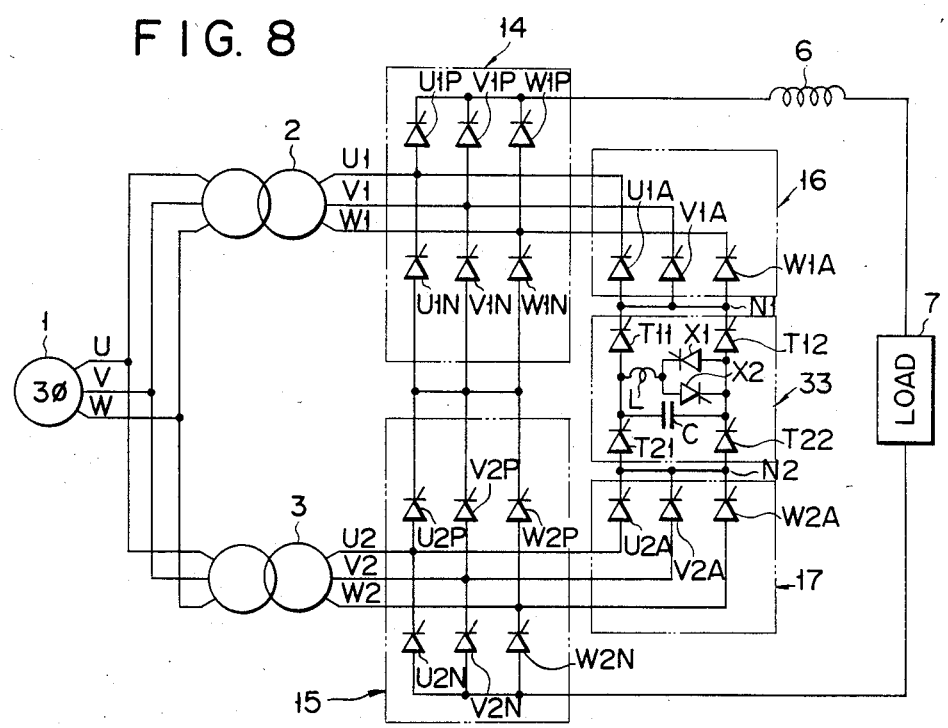
FIG. 8 shows a circuit configuration of a second embodiment of the present invention.

FIG. 8 shows a circuit configuration of a second embodiment of the present invention. The second embodiment of FIG. 8 is different from the first embodiment of FIG. 3 only in the configuration of the commutation circuit. Thus, a commutation circuit 33 of the second embodiment is further provided with a reactor L and cross-coupled inversion thyristors X1 and X2. The mode of operation of the second embodiment is basically the same as that of the first embodiment. In the first embodiment, the inversion of the capacitor voltage in commutation circuit 18 is performed by a current having a magnitude being equal to the load current I. From this, when the amount of load current I is very small, a substantial time is required to complete the voltage inversion of capacitor C, thereby adversely affecting the commutation operation of next sequence.

To avoid unreliable commutation operation due to the above, the following means is employed in the second embodiment. That is, after the current is shifted or commutated to the auxiliary thyristors and a certain period of time elapses, thyristor X1 or X2 is triggered in accordance with the voltage polarity of capacitor C. In other words, the polarity of the capacitor voltage is inverted by means of a resonance of reactor L and capacitor C. Simply stated, thyristor X1 or X2 is turned on when a given period of time (cf, $\tau$ in FIG. 13N) has elapsed after the completion of triggering of the auxiliary thyristors (U1A, V1A, W1A, U2A, V2A, W2A) and the commutation thyristors (T11, T12, T21, T22).

Figure 9:
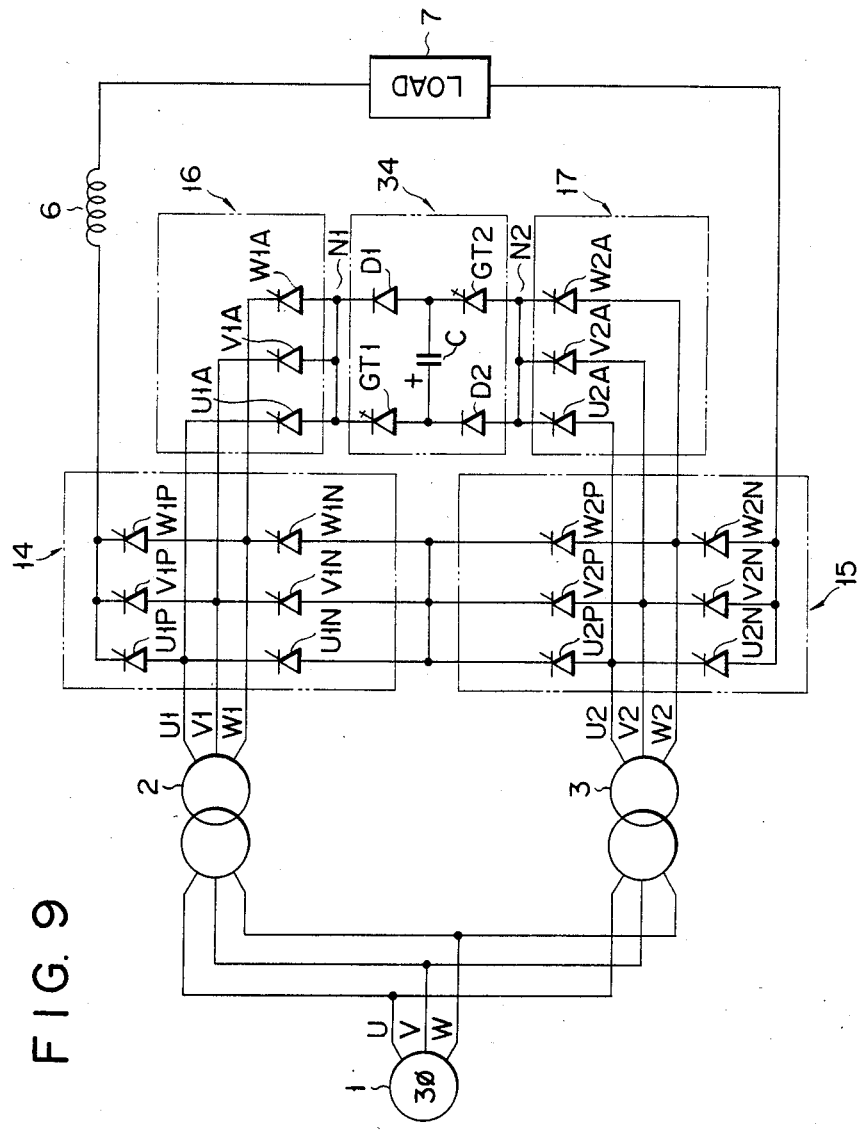
FIG. 9 shows a circuit configuration of a third embodiment of the present invention.

FIG. 9 shows a circuit configuration of a third embodiment of the present invention. The circuit of the third embodiment is different from that of the first and second embodiments in FIGS. 3 and 8, only in the configuration of the commutation circuit. A commutation circuit 34 of the third embodiment is formed of GTO thyristors GT1 and GT2, diodes D1 and D2, and capacitor C. In the second embodiment (FIG. 8), power loss due to the inversion of the capacitor voltage becomes prominent when the load current is small. In theory, no power loss appears with the inversion of the capacitor voltage. However, in practice, each of the reactor and capacitor includes resistive components, and voltage drops are inevitably involved with thyristors in turned-on state. Accordingly, a certain power loss cannot be avoided. The third embodiment is proposed to reduce such power loss and to remove the need for inverting the capacitor voltage. Capacitor C of commutation circuit 34 has a larger capacitance than those in the first and second embodiments and is initially charged in the polarity as indicated in FIG. 9. In order to perform a commutation for thyristors controlled in a phase-advanced mode, two auxiliary thyristors are turned on as in the former embodiments and, at the same time, GT0 thyristors GT1 and GT2 of commutation circuit 34 are also turned on. Then, a current path is established to discharge the capacitor C. By the discharged capacitor voltage, the current path is temporarily shifted from the thyristor bridge side to the auxiliary thyristor side.

After a certain period of time has elapsed corresponding to the turn-off time of a thyristor in turned-on state, extincting (OFF) pulses are supplied to GT0 thyristors GT1 and GT2. At the same time, triggering (ON) pulses are supplied to two series thyristors, which are to be triggered next, in the thyristor bridge. When thyristors GT1 and GT2 are turned off, the current, which has been flowing through the auxiliary thyristors, now flows via diodes D1 and D2 in the direction to charge the capacitor C. Then, the relationship between the capacitor voltage and the current after the polarity inversion of the capacitor voltage is established as in the first and second embodiments. Thus, the current which has been flowing to the auxiliary thyristors is now commutated to the thyristor bridge. During this commutating time period, capacitor C is charged. If the ON period of GT0 thyristors GT1 and GT2 is suitably controlled in accordance with the charged voltage of capacitor C, the discharged voltage can be made equal to the charged voltage. In this case, the capacitor voltage can be kept substantially constant by mere initial charging of capacitor C. GT0 thyristors GT1 and GT2 may be replaced with conventional bipolar transistors or with conventional thyristors being provided with a forced commutation circuit.

Figure 10:
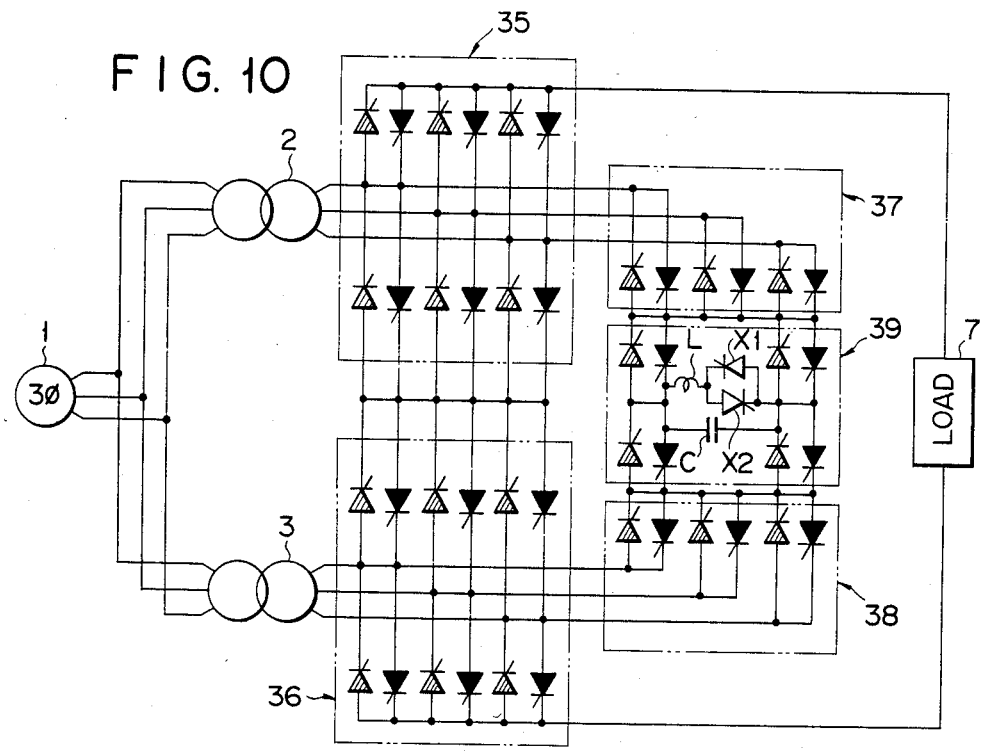
FIG. 10 shows a circuit configuration of a fourth embodiment of the present invention.

FIG. 10 shows a circuit configuration of a fourth embodiment of the present invention. The fourth embodiment is used for converting AC power of a given frequency to AC power of another frequency. The fourth embodiment of FIG. 10 is constructed based on the second embodiment of FIG. 8, wherein a bidirectional current or AC current is supplied to an AC load 7. The thyristors shown in FIG. 8 are replaced by two cross-coupled (inversely-parallel-connected) thyristors. (Each cross-coupled pair is illustrated by blacked-out and hatched thyristors.) In FIG. 10, capacitor C, reactor L and inverting thyristors X1 and X2 of commutation circuit 39 are commonly used for commutation of a load current in both positive and negative directions. In general, since the impedance of AC load 7 is inductive, a filtering reactor may be omitted. In order to flow a current in the positive direction from first thyristor bridge 35 through load 7 to second thyristor bridge 36, the same control as in the second embodiment is performed for the hatched thyristors and for the inverting thyristors X1 and X2 in commutation circuit 39. In order to flow a current to load 7 in the opposite or negative direction, the same control as in the second embodiment is performed for the blacked-out thyristors and for the inverting thyristors X1 and X2. Since the commutation operation is the same as that described with reference to the second embodiment, a description thereof is omitted.

Figure 11:
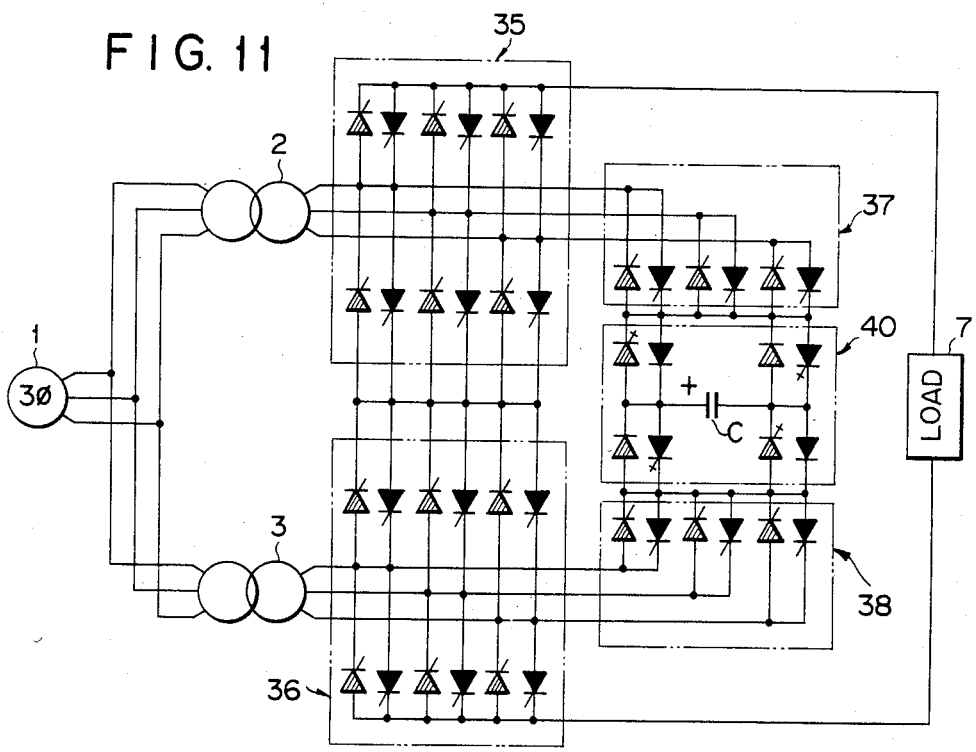
FIG. 11 shows a circuit configuration of a fifth embodiment of the present invention.

FIG. 11 shows a circuit configuration of a fifth embodiment of the present invention. The fifth embodiment is also used for converting AC power of a given frequency to AC power of another frequency. The fifth embodiment is the same as the fourth embodiment in FIG. 10 except for the configuration of a commutation circuit 40. Commutation circuit 40 is formed of GT0 thyristors and diodes and is basically the same as that of the third embodiment shown in FIG. 9. To make a current-flow in the positive direction, the hatched thyristors and hatched diodes are rendered conductive. To make a current-flow in the negative direction, the blacked-out thyristors and blacked-out diodes are rendered conductive. Since the commutation operation is the same as that described with reference to the third embodiment, explanation therefor will be omitted.

Figure 12:
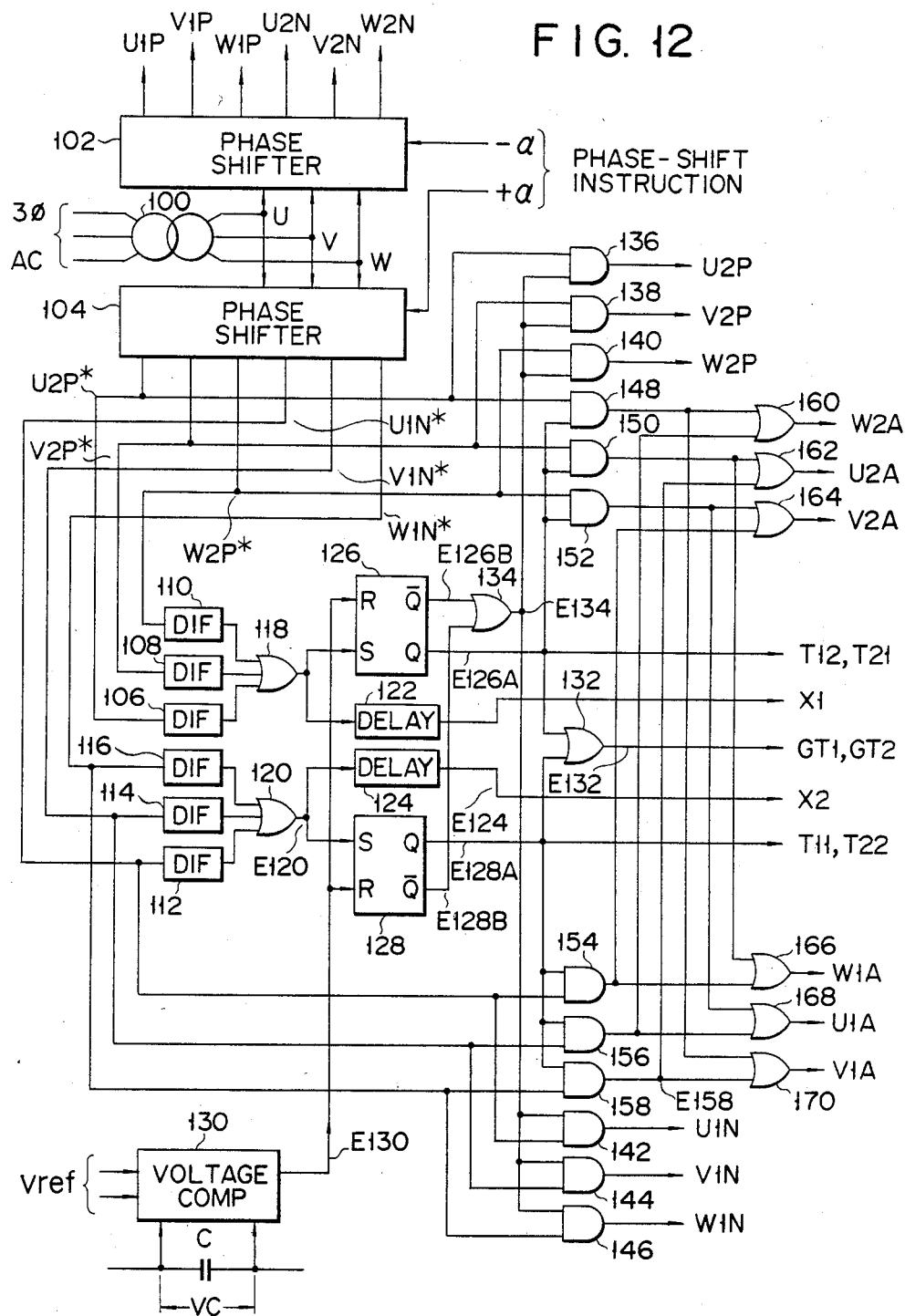
FIG. 12 shows details of a trigger control circuit which may be adapted for controlling the operation of the embodiment.

FIG. 12 shows details of a trigger control circuit which may be adapted for controlling the operation of the power converter shown in FIGS. 3, 8 or 9. The 3-phase AC lines is coupled to the primary of a 3-phase signal transformer 100. The secondary of transformer 100 provides 3-phase line voltage signals U, V and W. Signals U, V and W are supplied to phase shifters 102 and 104. The phase shift amount of phase shifters 102 and 104 is presettable or programmable according to an external phase-shift instruction. Phase shifter 102 may be the same as phase shifter 104 and may have a conventional configuration. Phase shifter 102 receives phase-shift instruction $-\alpha$ and provides trigger signals for thyristors U1P, V1P, W1P, U2N, V2N and W2N. Phase shifter 104 receives phase-shift instruction $+\alpha$ and provides polyphase signals U2P*, V2P*, W2P*, U1N*, V1N* and W1N* which are respectively corresponding to trigger signals for thyristors U2P, V2P, W2P, U1N, V1N and W1N.

Polyphase signals U2P*, V2P*, W2P*, U1N*, V1N* and W1N* are supplied to differentiation circuits 106, 108, 110, 112, 114 and 116, respectively. Differentiation circuits 106, 108 and 110 respectively generate pulses at the leading edges of signals U2P*, V2P* and W2P*. These pulsed are inputted to an OR gate 118. Differentiation circuits 112, 114 and 116 respectively generate pulses at the leading edges of signals U1N*, V1N* and W1N*. These pulsed are inputted to an OR gate 120.

An ORed output from OR gate 118 is supplied to a delay circuit 122, and an ORed output E120 from OR gate 120 is supplied to a delay circuit 124. When the embodiment of FIG. 8 is employed, a delayed pulse obtained from circuit 122 is used for triggering the thyristor X1 and a delayed pulse E124 obtained from circuit 124 is used for triggering the thyristor X2. The ORed output from OR gate 118 is supplied to the set input of an RS flip-flop 126, and the ORed output from OR gate 120 is supplied to the set input of an RS flip-flop 128. The reset input of each of flip-flops 126 and 128 receives a reset pulse E130 from a voltage comparator 130. Comparator 130 is responsive to a charged voltage VC of capacitor C of FIGS. 3, 8 or 9. When the trigger control circuit of FIG. 12 is used for the embodiment of FIG. 3 or 8, comparator 130 detects the condition of VC=0 (volts) so as to generate the reset pulse E130. When the trigger control circuit of FIG. 12 is used for the embodiment of FIG. 9, a reference voltage Vref is supplied to comparator 130 and comparator 130 detects the condition of VC<Vref so as to generate the reset pulse E130.

When the embodiment of FIG. 3 or 8 is employed, a Q output E126A from flip-flop 126 is used for triggering the thyristors T12 and T21 and a Q output E128A from flip-flop 128 is used for triggering the thyristors T11 and T22. Outputs E126A and E128A are supplied to an OR gate 132. When the embodiment of FIG. 9 is employed, an ORed output E132 from OR gate 132 is used for triggering the GTO thyristors GT1 and GT2.

An inverted Q output E126B from flip-flop 126 and an inverted Q output E128B from flip-flop 128 are supplied to an OR gate 134. An ORed output E134 from OR gate 134 is supplied to one input of each of AND gates 136 to 146. The other input of AND gate 136 receives polyphase signal U2P*. An ANDed output from AND gate 136 is used for triggering the thyristor U2P. The other input of AND gate 138 receives polyphase signal V2P*. An ANDed output from AND gate 138 is used for triggering the thyristor V2P. The other input of AND gate 140 receives polyphase signal W2P*. An ANDed output from AND gate 140 is used for triggering the thyristor W2P. The other input of AND gate 142 receives polyphase signal U1N*. An ANDed output from AND gate 142 is used for triggering the thyristor U1N. The other input of AND gate 144 receives polyphase signal V1N*. An ANDed output from AND gate 144 is used for triggering the thyristor V1N. The other input of AND gate 146 receives polyphase signal W1N*. An ANDed output from AND gate 146 is used for triggering the thyristor W1N.

One input of each of AND gates 148 to 152 receives Q output E126A from flip-flop 126. One input of each of AND gates 154 to 158 receives Q output E128A from flip-flop 128. The other input of AND gate 148 receives polyphase signal U2P*, the other input of AND gate 150 receives polyphase signal V2P*, and the other input of AND gate 152 receives polyphase signal W2P*. The other input of AND gate 154 receives polyphase signal U1N*, the other input of AND gate 156 receives polyphase signal V1N*, and the other input of AND gate 158 receives polyphase signal W1N*. An ANDed output from AND gate 148 is supplied to one input of each of OR gates 160 and 170. An ANDed output from AND gate 150 is supplied to one input of each of OR gates 162 and 166. An ANDed output from AND gate 152 is supplied to one input of each of OR gates 164 and 168. An ANDed output from AND gate 154 is supplied to the other input of each of OR gates 164 and 166. An ANDed output from AND gate 156 is supplied to the other input of each of OR gates 160 and 168. An ANDed output E158 from AND gate 158 is supplied to the other input of each of OR gates 162 and 170.

An ORed output from OR gate 160 is used for triggering the thyristor W2A, an ORed output from OR gate 162 is used for triggering the thyristor U2A, and and ORed output from OR gate 164 is used for triggering the thyristor V2A. An ORed output from OR gate 166 is used for triggering the thyristor W1A, an ORed output from OR gate 168 is used for triggering the thyristor U1A, and an ORed output from OR gate 170 is used for triggering the thyristor V1A.

The trigger control circuit of FIG. 12 in a phase-advanced mode will operate as follows. FIGS. 13A to 13R illustrate the timing of signals around time t1 in FIG. 4. Around time t1, polyphase signal U2P* has logic "1" level (FIG. 13A). Also, at time t1, the logic level of polyphase signal V1N* is changed from "1" to "0" (FIG. 13B), while the logic level of polyphase signal W1N* is changed from "0" to "1" (FIG. 13C). The leading edge of signal W1N* is differentiated through differentiation circuit 116, and set pulse E120 corresponding to the differentiated signal edge of W1N* is inputted to RS flip-flop 128 (FIG. 13D). Pulse E120 sets the flip-flop 128 so that the the logic level of Q output E128A becomes "1" (FIG. 13F) and the logic level of inverted Q output E128B becomes "0" (FIG. 13G).

Trigger signal E132 for GTO thyristors GT1 and GT2 of FIG. 9 is generated according to Q output E128A (FIG. 13H). Trigger signal E124 for thyristor X2 of FIG. 8 is obtained at time t11 by delaying the set pulse E120 by given time τ through delay circuit 124 (FIGS. 13D and 13N).

Inverted Q output E128B of logic "0" renders the logic level of ORed output E134 to be "0". This logic "0" output E134 is supplied to one input of AND gate 136. (RS flip-flop 126 is in set-mode in this instant so that the ORed output E134 from OR gate 134 only depends on the logical level of E128B.) Accordingly, though AND gate 136 receives at the other input the signal U2P* of logic "1", the ANDed output from AND gate 136 which is used for triggering the thyristor U2P becomes logic "0" (FIG. 13I). On the other hand, AND gate 144 receives logic "0" of signal V1N* (FIG. 13B) and logic "0" of ORed output E134. Accordingly, the ANDed output from AND gate 144 which is used for triggering the thyristor V1N becomes logic "0" (FIG. 13J).

AND gate 158 receives at its one input the logic "1" of signal W1N* (FIG. 13C) and at the other input the logic "1" of Q output E128A (FIG. 13F). Then, the ANDed output E158 from AND gate 158 becomes logic "1". This ANDed output E158 of logic "1" is supplied to OR gates 170 and 162, thereby obtaining a logic "1" triggering signal for thyristor V1A (FIG. 13L) and a logic "1" triggering signal for thyristor U2A (FIG. 13M).

Figure 13:
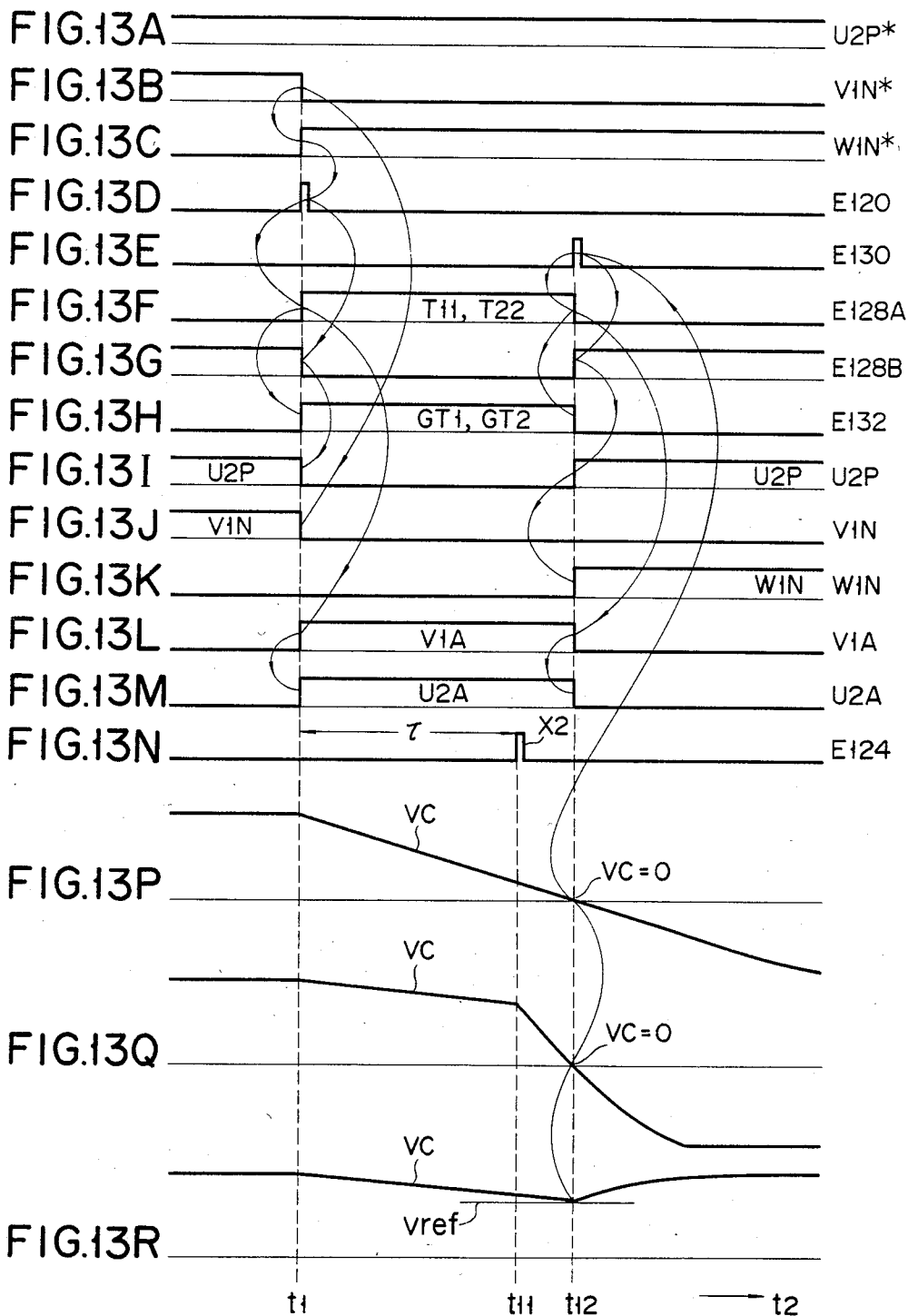
FIG. 13 shows a timing chart illustrating the operation of the circuit of FIG. 12.

When the trigger control circuit of FIG. 12 is applied to the embodiment of FIG. 3, triggering signals generated after time t1 in FIG. 13 render the thyristors V1A, U2A, T11 and T22 conductive, so that a reverse-charging current path is formed. This reverse-charging current path serves to discharge the capacitor C. Then, the charged voltage VC of capacitor C is lowered (after t1 in FIG. 13P). This charged voltage VC is checked in voltage comparator (zero-cross sensor) 130. When the voltage VC reaches 0 volts, comparator 130 generates the reset pulse E130 (at t12 in FIGS. 13E and 13P). Pulse E130 resets flip-flop 128 so that Q output E128A becomes logic "0" (at t12 in FIG. 13F) and inverted Q output E128B becomes logic "1" (at t12 in FIG. 13G). Pulse E130 also resets flip-flop 126 so that E126A and E126B become "0" and "1", respectively.

Q output E128A having logic "0" level is supplied to AND gate 158 which receives signal W1N* having logic "1" level (at t12 in FIGS. 13C and 13F). AND gate 158 is closed by logic "0" of E128A, so that the ANDed output E158 becomes logic "0". At this time, AND gates 148 and 150 are both closed by the logic "0" of Q output E128A from flip-flop 126 which is reset at time t12 by pulse E130. From this, the ANDed output respectively supplied from AND gates 148 and 150 to OR gates 170 and 162 are logic "0". Accordingly, the logic "0" level of ANDed output E158 renders the logic level of each of signals for triggering the thyristors V1A and U2A to be "0" (FIGS. 13L and 13M).

At time t12, the logic "0" of Q outputs E126A and E128A renders the logic level of ORed output E132 to "0" (FIG. 13H). At the same time, the logic "1" of inverted Q outputs E126B and E128B renders the logic level of ORed output E134 to "1". Since AND gate 136 receives this logic "1" ORed output and signal U2P* having logic level "1" (FIG. 13A), the ANDed output from AND gate 136 becomes logic "1" (FIG. 13I). The above logic "1" ORed output E134 is also supplied to AND gate 146 which receives signal W1N* having logic level "1" (FIG. 13C). Then, AND gate 146 provides a logic "1" ANDed output for triggering the thyristor W1N (at t12 in FIG. 13K). The commutation in the phase-advanced mode is thus completed.

The operation of the trigger control circuit of FIG. 12 in a phase-delayed mode is performed according to the timing as illustrated in FIG. 4.

When the trigger control circuit of FIG. 12 is applied to the embodiment of FIG. 8, triggering signals generated after time t1 in FIG. 13 render the thyristors V1A, U2A, T11 and T22 conductive, so that a reverse-charging current path is formed. This reverse-charging current path serves to discharge the capacitor C. Then, the charged voltage VC of capacitor C is lowered (after t1 in FIG. 13Q). When a period corresponding to the given delay time $\tau$ of delay circuit 124 has elapsed after time t1, trigger signal E124 is generated (time t11 in FIG. 13N). Then, thyristor X2 is turned on so that the discharging for capacitor C is accelerated via a current flowing through inductor L and thyristor X2. After time t11, the charged voltage VC is rapidly lowered (FIG. 13Q). This voltage VC is checked in voltage comparator (zero-cross sensor) 130. When the potential of voltage VC crosses the zero potential, comparator 130 generates the reset pulse E130 (at t12 in FIGS. 13E and 13Q). Pulse E130 resets flip-flop 128 so that Q output E128A becomes logic "0" and inverted Q output E128B becomes logic "1" (at t12 in FIGS. 13F and 13G). At time t12, ANDed outputs from AND gates 136 and 146 both become logic "1" (FIGS. 13I and 13K), and the commutation of FIG. 8 embodiment in the phase-advanced mode is completed.

When the trigger control circuit of FIG. 12 is applied to the embodiment of FIG. 9, triggering signals generated after time t1 in FIG. 13 render the thyristors V1A, U2A, GT1 and GT2 conductive, so that a reverse-charging current path is formed. This reverse-charging current path serves to discharge the capacitor C. Then, the charged voltage VC of capacitor C is lowered (after t1 in FIG. 13R). This charged voltage VC is checked in voltage comparator 130. When the potential of voltage VC crosses a reference potential Vref applied to comparator 130 (i.e., VC<Vref), comparator 130 generates the reset pulse E130 (at t12 in FIGS. 13E and 13R). Pulse E130 resets flip-flop 128 so that Q output E128A becomes logic "0" and inverted Q output E128B becomes logic "1" (at t12 in FIGS. 13F and 13G). At time t12, ANDed outputs from AND gates 136 and 146 both become logic "1" (FIGS. 13I and 13K), and the commutation of FIG. 9 embodiment in the phase-advanced mode is completed.

As has been described above, according to the present invention, reactive power of the power supply can be reduced, and the commutation involves only a moderate current change rate so that substantially no surge voltage is generated. Further, in a certain control angle, an output current from a power transformer becomes zero and power loss in the power transformer is reduced (cf. FIG. 7). Thus, the power conversion efficiency is improved. In addition, as may be seen from some of the embodiments, the power converter of the present invention can be reduced to practice in a relatively simple configuration, in contrast to the advantages obtained.

Figure 14:
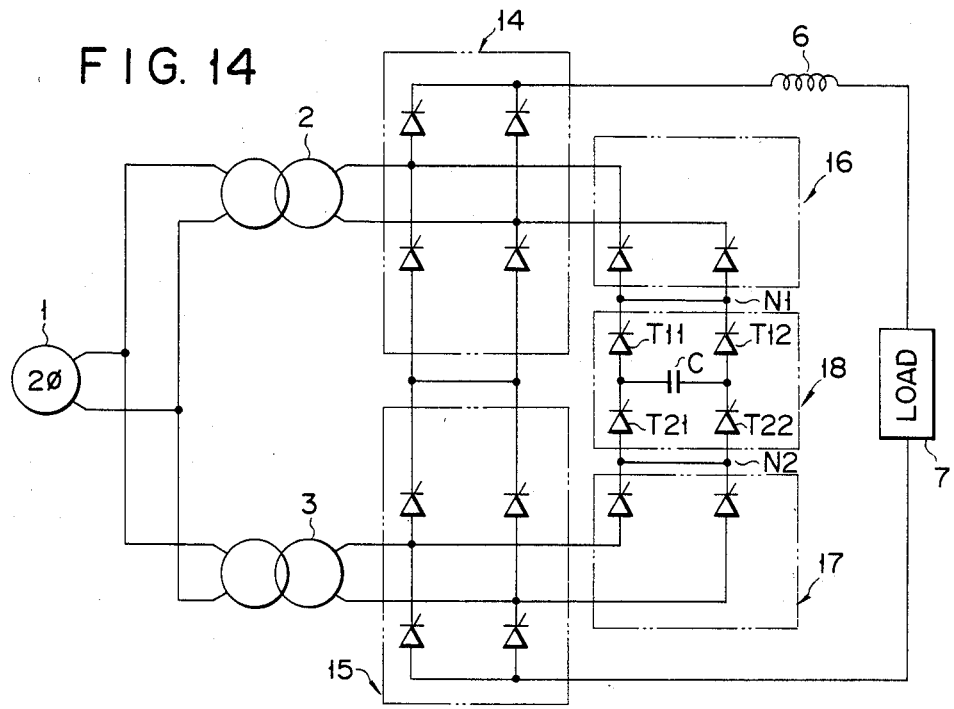
FIG. 14 shows a modification of the embodiment of FIG. 3, which is applied to a single-phase AC power supply.
Figure 15:
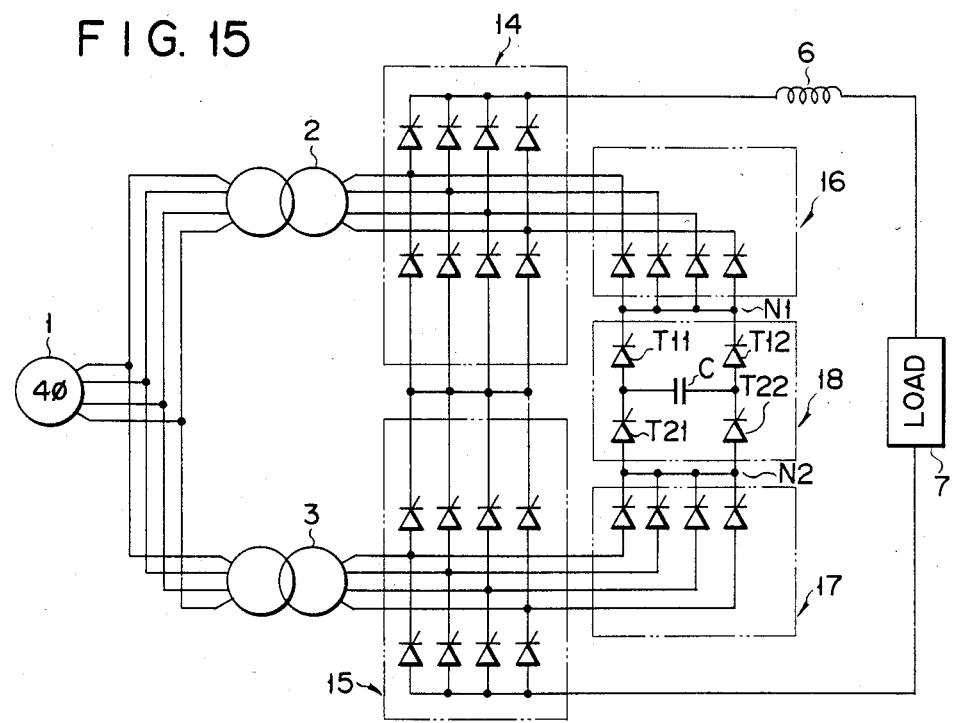
FIG. 15 shows another modification of the embodiment of FIG. 3, which is applied to a polyphase (four-phase) AC power supply.

Although the present invention has been described with reference to a 3-phase power supply, the present invention may be similarly applied to a single-phase power supply or polyphase power supplies other than 3-phase ones. FIG. 14 shows an example for the single-phase configuration, and FIG. 15 shows an example for the polyphase (4-phase) configuration. Although illustration is omitted, snubber circuits or anode reactors may be adapted to the respective thyristors, or reactors may be provided between each thyristor of the thyristor bridge and the output terminal of the thyristor bridge, thereby reducing mutual interferences among thyristors when commutations are simultaneously performed under the phase-advanced and phase-delayed control modes.

What is claimed is:

1. A power converter comprising:
    power source means for supplying a first AC power and a second AC power which is isolated from the first AC power;
    thyristor bridge means coupled to said power source means, for converting said first and second AC power into a given converted power which is supplied to a load of the power converter;
    a first thyristor circuit coupled to said power source means and including plural first auxiliary thyristors each having two terminals between which a current path is formed, one terminal of each of said first auxiliary thyristors receiving said first AC power and the other terminal of each of said first auxiliary thyristors being coupled to a first node;
    a second thyristor circuit coupled to said power source means and including plural second auxiliary thyristors each having two terminals between which a current path is formed, one terminal of each of said second auxiliary thyristors receiving said second AC power and the other terminal of each of said second auxiliary thyristors being coupled to a second node; and
    commutation circuit means coupled between said first and second nodes, for commutating at least a part of a current flowing through said thyristor bridge means to the current path of said first and second thyristor circuits.

2. A power converter according to claim 1, wherein said commutation circuit means includes:
    a first thyristor having two terminals between which a current path is formed, one terminal of said first thyristor being coupled to the first node of said first thyristor circuit;
    a second thyristor having two terminals between which a current path is formed, one terminal of said second thyristor being coupled to the first node of said first thyristor circuit;
    a third thyristor having two terminals between which a current path is formed, one terminal of said third thyristor being coupled to the other terminal of said first thyristor and the other terminal of said third thyristor being coupled to the second node of said second thyristor circuit;
    a fourth thyristor having two terminals between which a current path is formed, one terminal of said fourth thyristor being coupled to the other terminal of said second thyristor and the other terminal of said fourth thyristor being coupled to the second node of said second thyristor circuit; and a capacitor coupled between the other terminal of said first thyristor and the other terminal of said second thyristor.

3. A power converter according to claim 2, wherein said thyristor bridge means is formed of plural cross-coupled thyristors, each auxiliary thyristor of said first and second thyristor circuits is formed of cross-coupled thyristors, and each of the first to fourth thyristors of said commutation circuit means is formed of cross-coupled thyristors.

4. A power converter according to claim 2, wherein said power source means includes:

a first power transformer whose primary circuit is connected to an AC power supply and whose secondary circuit provides said first AC power; and a second power transformer whose primary circuit is connected to said AC power supply and whose secondary circuit provides said second AC power.

5. A power converter according to claim 2, further comprising:

trigger control means coupled to said first and second thyristor circuits, for controlling the triggering operation of said first and second auxiliary thyristors, so that the commutation by said commutation circuit means is performed.

6. A power converter according to claim 5, wherein said second and third thyristors are rendered conductive by said trigger control means so that said capacitor is charged and, after said second and third thyristors are rendered nonconductive, said first and fourth thyristors are rendered conductive by said trigger control means so that said capacitor is discharged, and wherein said trigger control means includes means coupled to said capacitor, said first to fourth thyristors, said first auxiliary thyristors and said second auxiliary thyristors, for comparing a capacitor voltage appearing across said capacitor with a given voltage and enabling the commutation of said commutation circuit means when the capacitor voltage corresponds to the given voltage.

7. A power converter according to claim 5, wherein said thyristor bridge means includes:

first positive side thyristors controlled by said trigger control means in a phase-delayed mode with a first phase control angle;

first negative side thyristors controlled by said trigger control means in a phase-advanced mode with a second phase control angle, said first negative side thyristors being connected in series to said first positive side thyristors and the circuit connection between said first positive side thyristors and said first negative side thyristors receiving the first AC power of said power source means;

second positive side thyristors controlled by said trigger control means in the phase-advanced mode with said second phase control angle, said second positive side thyristors being connected in series to said first negative side thyristors; and second negative side thyristors controlled by said trigger control means in the phase-delayed mode with said first phase control angle, said second negative side thyristors being connected in series to said second positive side thyristors, the circuit connection between said second positive side thyristors and said second negative side thyristors receiving the second AC power of said power source means, and the load of the power converter being coupled to circuit ends of the series circuit of said first positive side thyristors, said first negative side thyristors, said second positive side thyristors and said second negative side thyristors, and wherein said first positive side thyristors, said first negative side thyristors, said second positive side thyristors and said second negative side thyristors are so controlled by said trigger control means with said first and second phase control angles that a phase difference between the voltage and the current of a fundamental wave of said first and second AC power is minimized, thereby reducing reactive power of the AC power.

8. A power converter according to claim 2, wherein said commutation circuit means further includes:

a pair of cross-coupled discharge thyristors coupled to said capacitor; and an inductor connected in series to said cross-coupled discharge thyristors, the series circuit of said cross-coupled discharge thyristors and said inductor being connected in parallel to said capacitor, and said capacitor being discharged via said inductor when said cross-coupled discharge thyristors is rendered conductive.

9. A power converter according to claim 8, wherein said power source means includes:

a first power transformer whose primary circuit is connected to an AC power supply and whose secondary circuit provides said first AC power; and a second power transformer whose primary circuit is connected to said AC power supply and whose secondary circuit provides said second AC power.

10. A power converter according to claim 8, wherein said thyristor bridge means is formed of plural cross-coupled thyristors, each auxiliary thyristor of said first and second thyristor circuits is formed of cross-coupled thyristors, and each of the first to fourth thyristors of said commutation circuit means is formed of cross-coupled thyristors.

11. A power converter according to claim 8, further comprising:

trigger control means coupled to said first and second thyristor circuits, for controlling the triggering operation of said first and second auxiliary thyristors, so that the commutation by said commutation circuit means is performed.

12. A power converter according to claim 11, wherein said second and third thyristors are rendered conductive by said trigger control means so that said capacitor is charged and, after said second and third thyristors are rendered nonconductive, said first and fourth thyristors are rendered conductive by said trigger control means so that said capacitor is discharged, and wherein said trigger control means includes means coupled to said capacitor, said first to fourth thyristors, said first auxiliary thyristors and said second auxiliary thyristors, for comparing a capacitor voltage appearing across said capacitor with a given voltage and enabling the commutation of said commutation circuit means when the capacitor voltage corresponds to the given voltage.

13. A power converter according to claim 12, wherein said trigger control means includes means for conducting one of said cross-coupled discharge thyristors after one of said first and second thyristors is rendered conductive and before said one thyristor is rendered nonconductive by the commutation of said commutation circuit means.

14. A power converter according to claim 1, wherein said commutation circuit means includes:
- a first gate turn-off thyristor having two terminals between which a current path is formed, one terminal of said first gate turn-off thyristor being coupled to the first node of said first thyristor circuit;
- a first diode having two terminals between which a current path is formed, one terminal of said first diode being coupled to the first node of said first thyristor circuit;
- a second gate turn-off thyristor having two terminals between which a current path is formed, one terminal of said third thyristor being coupled to the other terminal of said first diode and the other terminal of said second gate turn-off thyristor being coupled to the second node of said second thyristor circuit;
- a second diode having two terminals between which a current path is formed, one terminal of said second diode being coupled to the other terminal of said first gate turn-off thyristor and the other terminal of said second diode being coupled to the second node of said second thyristor circuit; and
- a capacitor coupled between the other terminal of said first gate turn-off thyristor and the other terminal of said first diode.

15. A power converter according to claim 14, wherein said thyristor bridge means is formed of plural cross-coupled thyristors, and
each auxiliary thyristor of said first and second thyristor circuits is formed of cross-coupled thyristors, and wherein said commutation circuit means further includes:
- a third gate turn-off thyristor being cross-coupled to said first diode;
- a fourth gate turn-off thyristor being cross-coupled to said second diode;
- a third diode being cross-coupled to said first gate turn-off thyristor; and
- a fourth diode being cross-coupled to said second gate turn-off thyristor.

16. A power converter according to claim 14, wherein said power source means includes:
- a first power transformer whose primary circuit is connected to an AC power supply and whose secondary circuit provides said first AC power; and
- a second power transformer whose primary circuit is connected to said AC power supply and whose secondary circuit provides said second AC power.

17. A power converter according to claim 14, further comprising:
trigger control means coupled to said first and second thyristor circuits, for controlling the triggering operation of said first and second auxiliary thyristors, so that the commutation by said commutation circuit means is performed.

18. A power converter according to claim 17, wherein said second and third thyristors are rendered conductive by said trigger control means so that said capacitor is charged and, after said second and third thyristors are rendered nonconductive, said first and fourth thyristors are rendered conductive by said trigger control means so that said capacitor is discharged,
and wherein said trigger control means includes means coupled to said capacitor, said first to fourth thyristors, said first auxiliary thyristors and said second auxiliary thyristors, for comparing a capacitor voltage appearing across said capacitor with a given voltage and enabling the commutation of said commutation circuit means when the capacitor voltage corresponds to the given voltage.

19. A power converter according to claim 17, wherein said first and second gate turn-off thyristors are rendered conductive by said trigger control means so that said capacitor is discharged and, after said first and second gate turn-off thyristors are rendered nonconductive, said first and second diodes are rendered conductive so that said capacitor is charged,
and wherein said trigger control means includes means coupled to said capacitor, said first and second gate turn-off thyristors, said first auxiliary thyristors and said second auxiliary thyristors, for comparing a capacitor voltage appearing across said capacitor with a reference voltage and enabling the commutation of said commutation circuit means when the capacitor voltage corresponds to the reference voltage.

20. A power converter comprising:
- first and second AC power supplies which are isolated from each other;
- a first thyristor bridge energized by said first AC power supply;
- a second thyristor bridge energized by said second AC power supply;
- a first auxiliary thyristor circuit containing plural auxiliary thyristors, in which one terminal of each auxiliary thyristor therein is connected to said first AC power supply and the other terminal thereof is commonly connected to a first node;
- a second auxiliary thyristor circuit containing plural auxiliary thyristors, in which one terminal of each auxiliary thyristor therein is connected to said second AC power supply and the other terminal thereof is commonly connected to a second node; and
- a commutation circuit connected between said first and second nodes, wherein an output from said first thyristor bridge and an output from said second thyristor bridge are series-connected to provide an output of the power converter.

* * * * *